United States Patent [19]
Choi

[11] Patent Number: 5,777,971
[45] Date of Patent: Jul. 7, 1998

[54] OPTICAL HEAD WITH A MICRO FRESNEL LENS INTEGRATED ON A BEAM SPLITTER

[75] Inventor: Yang-Oh Choi, Seoul, Rep. of Korea

[73] Assignee: Daewoo Electronics Co., Ltd., Seoul, Rep. of Korea

[21] Appl. No.: 656,487

[22] Filed: May 31, 1996

[30] Foreign Application Priority Data

May 31, 1995 [KR] Rep. of Korea ..................... 95-14149
May 31, 1995 [KR] Rep. of Korea ..................... 95-14150

[51] Int. Cl.$^6$ ........................................... G11B 7/00
[52] U.S. Cl. .................. 369/112; 369/44.23; 369/103; 369/109; 369/110
[58] Field of Search .................. 369/44.11, 112, 369/44.21, 44.12, 44.37, 44.14, 109, 44.23, 103, 110; 359/628, 563, 569; 430/321, 296, 324

[56] References Cited

U.S. PATENT DOCUMENTS

| | | | |
|---|---|---|---|
| 4,737,447 | 4/1988 | Suzuki et al. | 430/321 |
| 4,870,632 | 9/1989 | Shiono et al. | 369/44.23 |
| 4,935,911 | 6/1990 | Ohuchida et al. | 369/44.11 |
| 5,231,620 | 7/1993 | Ohuchida | 369/112 |
| 5,345,336 | 9/1994 | Aoyama et al. | 359/628 |
| 5,377,177 | 12/1994 | Horinouchi et al. | 369/112 |
| 5,646,929 | 7/1997 | Choi | 369/112 |

FOREIGN PATENT DOCUMENTS

0346121 A2 12/1989 European Pat. Off.

OTHER PUBLICATIONS

Patent Abstracts of Japan, vol. 3, No. 14, 29 Mar. 1996—JP 7-311961A Nippon Steel Corporation, 28 Nov. 1995.
European Search Report, EP 96303808.8, sent Jan. 12, 1998.

*Primary Examiner*—Tod R. Swann
*Assistant Examiner*—Kim-Kwok Chu
*Attorney, Agent, or Firm*—Pennie & Edmonds LLP

[57] ABSTRACT

Disclosed is an optical pickup having simplified constitution. A light source for radiating laser beam for reading an optical disc is comprised. A beam splitter for separating the laser beam radiated from the light source into transmitting light and reflecting light and for separating light from the optical disc into transmitting light and reflecting light is provided. Installed is an objective lens for converging light from the beam splitter to form a focus on the optical disc and for forwarding light from the optical disc to the beam splitter. A micro fresnel lens attached on one side of the beam splitter is included. The micro fresnel lens generates astigmatism and converges the incident light from the beam splitter. A photodetector receives light from the micro fresnel lens, reproduces information recorded on the optical disc and detects a focus error. The manufacture of the optical pickup is advantageous and the product has improved quality.

15 Claims, 7 Drawing Sheets

OPTICAL HEAD WITH A MICRO FRESNEL LENS INTEGRATED ON A BEAM SPLITTER

BACKGROUND OF THE INVENTION

1. Field of the Invention

The present invention relates to an optical pickup, and more particularly to a novel optical pickup having simplified constitution and for which the manufacturing procedure is advantageous by employing a micro fresnel lens.

2. Description of the Prior Art

Generally, in an optical disc reproducing device for reproducing the information recorded in an information recording medium having optical disc shape, a driving mechanism for the optical disc is provided for reproducing the information. In this kind of optical disc, since unit information is recorded in a plurality of tracks, a great quantity of information can be recorded to accomplish mass information recording when compared with a magnetic information recording medium using the magnetic characteristic. By utilizing such characteristics of the optical disc and recording stationary images or moving images on the optical disc, information having high quality of sound and high resolution can be obtained.

As is well known in the art, if the tracks are formed in a spiral shape on the optical disc, sectors in a track are not at the same distances from the rotational center of the optical disc due to the eccentricity of the disc. Accordingly, tracking control is essential for accurate radiation of the laser beam on the track. Although the tracks are formed in circular shape, sectors in a track are not at the same distances from the rotational center of the optical disc due to the eccentricity of the disc. Accordingly, tracking control also is essential. For the tracking control, the optical pickup utilizes a 1-beam method in reading the information using a single laser beam (see U.S. Pat. No. 4,767,921 issued to Ryoichi) and a 3-beam method in which the single laser beam is separated into three beams using a diffraction grating for reading the information (see U.S. Pat. No. 4,973,886 issued to Matsuoka, U.S. Pat. No. 5,073,888 issued to Takahashi, etc.).

The tracking control in the optical pickup could be accomplished by operating tracking actuators in response to the tracking error signals which are induced from the light reflected by or transmitted through the optical disc and optical lenses. The light has been originated from the 1-beam or 3-beam generated from the laser beam emitted from a light source through the 1-beam or 3-beam method.

Meanwhile, since the disc is rotated at a lead mode, the distance from the optical pickup to the disc becomes minutely changed. This change makes accurate reading of the information difficult and so focusing control is essential. To control the focusing, an astigmatic method using astigmatism (see U.S. Pat. No. 4,862,446 issued to Takanori), a knife edge method (see U.S. Pat. Nos. 4,684,799 issued to Masami et al., & 4,868,377 issued to Koichiro), etc. are used. In the optical pickup, the laser beam emitted from the laser beam source is reflected by or transmitted through the optical disc and the optical lenses and induces a focusing error signal. In response to the signal, focusing actuators are operated to control the focusing.

The optical pickup having the above-mentioned constitution will be described in detail with reference to the attached drawings below.

FIG. 1 schematically illustrates the conventional optical pickup. A light source 10 consisting of one laser diode generates a laser beam. In the case of the 3-beam type, a diffraction grating 11 for separating the laser beam into three beams is provided. The laser beam emitted from light source 10 is separated into three beams by diffraction grating 11, and then separated into reflecting light and transmitting light by a beam splitter 12. Among them, the reflected light toward an optical disc 15 is transformed into parallel light by a collimator lens 13. The parallel light passes through an objective lens 14 to form about a 1 μm beam spot on the surface of disc 15 to read the information recorded on the disc.

At this time, beam splitter 12 is formed by installing two right angled prisms through facing two inclined planes having 45° and transmits a part of the inputted light and reflects the remaining inputted light at 90°.

The laser beam radiated on the surface of disc 15 is reflected with differing amounts of reflection light according to the presence of a pit 15a in which the information is recorded. On the basis of the amount of the reflection light, the information is reproduced. The reflected light is transformed into the parallel light again by objective lens 14 to direct to beam splitter 12. A portion of the incident light is reflected at 90°, while the remaining incident light passes through the beam splitter. An astigmatism generating lens 16 is provided in the path of the transmitting light and a photodetector 17 of 4-separation or 6-separation is installed for receiving the light.

From the image of the incident light of photodetector 17, the accuracy of the position of the optical pickup is detected. That is, the focusing error and the tracking error are detected to generate the focusing and tracking error signals. In response to the signals, a voice coil motor (not shown) which is the actuator of the objective lens is driven to move objective lens 14 to control the focusing and tracking errors. On the basis of the amount of the reflected light determined by pit 15a of optical disc 15, the information reproduction can be accomplished.

FIG. 2 schematically illustrates a dual focus optical pickup as another example of the conventional optical pickup.

The dual focus optical pickup forms two foci at two different positions to selectively read the information recorded on, for example, a 1.2 mm thick optical disc and a 0.6 mm thick optical disc. (See U.S. Pat. No. 5,446,565 issued to Komma et al.) First, the laser beam emitted from a light source 20 is separated into three beams when passing through a diffraction grating 21 and then the beams are separated into transmitting light and reflecting light by a beam splitter 22, as also shown in FIG. 1. The reflected light from beam splitter 22 is transformed into parallel light by a collimator lens 23 formed at the upper portion of beam splitter 22. Then, the incident light into a compound lens obtained by aligning a holographic optical lens 24 and an objective lens 25 forms two focal points to selectively read the information recorded on a first optical disc 26 and a second optical disc 27.

That is, the laser beam is converged to about a 1 μm spot in an airy disk shape to radiate pits 26a and 27a on first and second optical discs 26 and 27. The beam is totally reflected at the disc where the pits are not formed, while being diffracted at the disc where the pits are formed to be out of the objective lens. This results in a part of the incident light returning to produce a difference in the amount of the light.

The reflected and deformed optical information from the optical disc passes the compound lens, collimator lens 23 and beam splitter 22. Then the information is transmitted to an astigmatism generating lens 28 to generate the astigmatism for detecting the focusing error. The optical information is sent to a 6-separated photodetector 29 and RF signal, focus signal and tracking signal are transformed into currents and the currents are reproduced by a control circuit into the original signals for reproduction.

FIG. 3 schematically illustrates another optical pickup using a light source radiating a polarized laser beam.

The polarized laser beam radiated from a light source 30 is separated into three beams after passing through a diffraction grating 31. The light beams are transformed into parallel light by a collimator lens 32. The transformed parallel light is incident to a beam splitter 33 and passes through a polarization layer 34 which transmits all the incident polarized light to pass a wavelength transforming portion, that is, a λ/4 wavelength plate 35. This plate transforms linear polarization into circular polarization or circular polarization into linear polarization. The laser beam converged by an objective lens 36 and then incident on the surface of an optical disc 37 is reflected with different amount of reflection light according to the presence or absence of a pit 37a where the information is recorded. The reflected light is transformed into the parallel light through objective lens 36 and is polarized by 90° degree through λ/4 wavelength plate 35. Then, the incident light to beam splitter 33 is totally reflected by 90° degree at polarization layer 34. In the passage of the reflected light, a condensing lens 38a and a cylindrical lens 38b (or a knife edge) are installed as a astigmatism generating device to converge the reflected light and to generate the astigmatism. Then the light is incident into a 4-separated or 6-separated photodetector 39.

From the image of the light received by photodetector 39, the accuracy of the optical pickup to the disc. i.e. focusing error and tracking error are detected to generate the focusing and tracking error signals. In response to the signals, a voice coil motor (not shown) which is the actuator of the objective lens is driven to move the objective lens to control the focusing and the tracking. Further, on the basis of the amount of the reflected light determined by pit 37a of disc 37, the reproduction of the information is accomplished.

Other than the above-mentioned optical pickups, a miniaturized optical disc having high capacity as an optical medium having two layers for recording data is developed as disclosed in U.S. Pat. No. 5,134,604 issued to Nagashima et al.

However, in the above-mentioned various optical pickups, excessive numbers of optical devices are needed for reproducing the information recorded in the information recording medium and for controlling the focusing and the tracking by the laser beam radiated from the light source, thereby resulting in large-sized optical pickups and high manufacturing cost. Moreover, the various optical devices should be adjusted accurately along the light passage.

SUMMARY OF THE INVENTION

To solve the problems of the conventional art, it is an object of the present invention to provide an optical pickup which has a simplified constitution and the manufacturing procedure is advantageous, thereby improving the product quality.

To accomplish the object there is provided in the present invention an optical pickup comprising: a light source for radiating a laser beam for reading an optical disc; a beam splitter for separating the laser beam radiated from the light source into transmitting light and reflecting light and for separating a light from the optical disc into transmitting light and reflecting light; an objective lens for converging light from the beam splitter to form a focus on the optical disc and for forwarding light from the optical disc to the beam splitter; a micro fresnel lens attached on one side of the beam splitter, the micro fresnel lens generating astigmatism and converging the incident light from the beam splitter; and a photodetector for receiving light from the micro fresnel lens, reproducing an information recorded on the optical disc and detecting a focus error.

Particularly, the photodetector is installed on one side of the beam splitter, where is the opposite side to the side where the micro fresnel lens is attached.

The photodetector also can be separately installed from the beam splitter on the extension line from the micro fresnel lens.

For any case, a diffraction grating for separating the laser beam into three beams can be installed between the light source and the beam splitter and a collimator lens for transforming the laser beam into parallel light can be provided at an appropriate position.

Meantime, a holographic optical lens or a micro fresnel lens can be provided to form two foci at different positions to selectively reproduce two optical discs having different thicknesses in a dual focus optical pickup.

The laser beam can be a polarized beam. At this time, a polarization layer is formed at the inclination of the beam splitter for transmitting the polarized beam, while reflecting the light having opposite phase to the polarized beam. A wavelength transforming portion for transforming linear polarization into circular polarization and circular polarization into linear polarization is provided between the beam splitter and the objective lens. The micro fresnel lens and the photodetector are installed at the same side where the light is reflected from the polarization layer.

In this case, the diffraction grating for separating the laser beam from the light source into three beams also can be provided between the light source and the beam splitter. The collimator lens for transforming the laser beam into parallel light also can be included at an appropriate position.

Also, a holographic optical lens or a micro fresnel lens can be provided to form two foci at different positions to selectively reproduce two optical discs having different thickness in a dual focus optical pickup.

The optical pickup according to the present invention utilizes the micro fresnel lens as an astigmatism generating lens. The micro fresnel lens can be attached to the beam splitter to simplify the assembling process and the constitution of the optical system.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Hereinafter, the constituting elements and the operation principles of the optical pickup according to some embodiments of the present invention will be explained in more detail with reference to the accompanying drawings.

Figure 1:
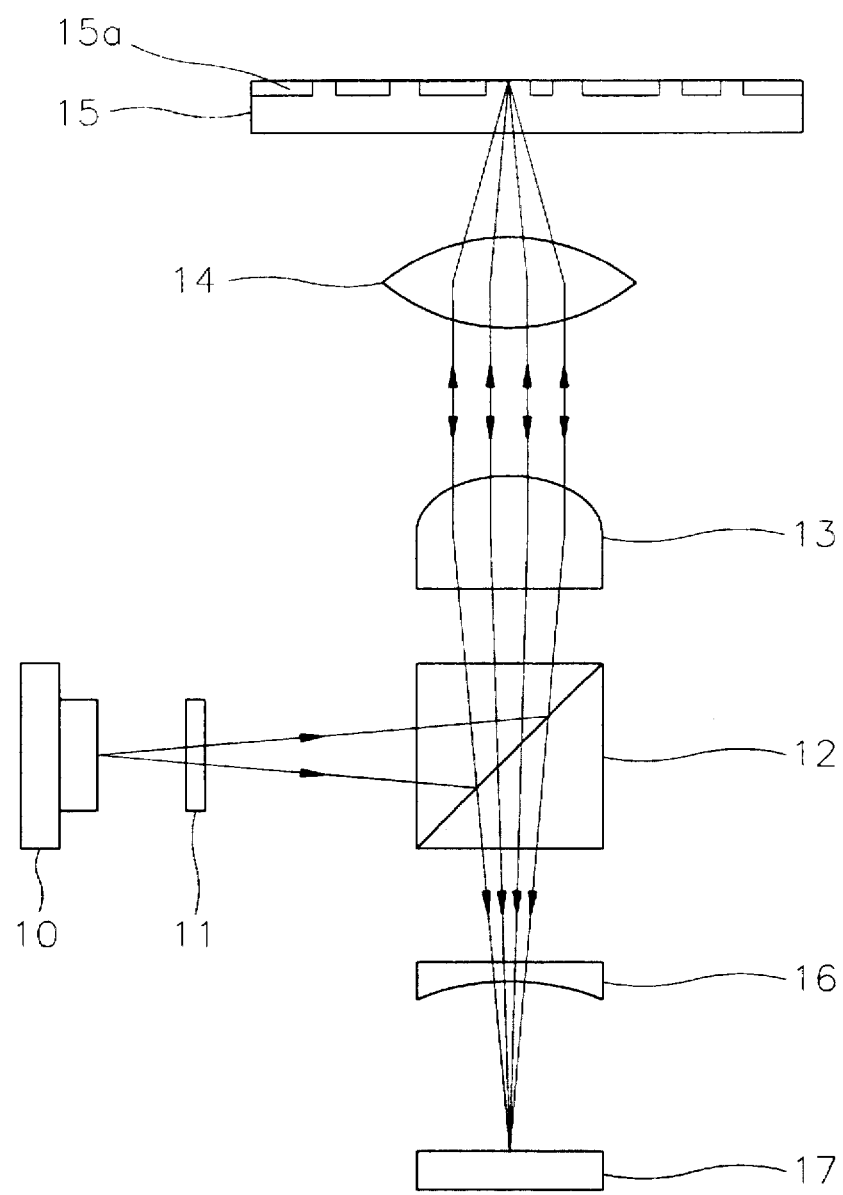
FIG. 1 is a schematic view for illustrating the conventional optical pickup.
Figure 2:
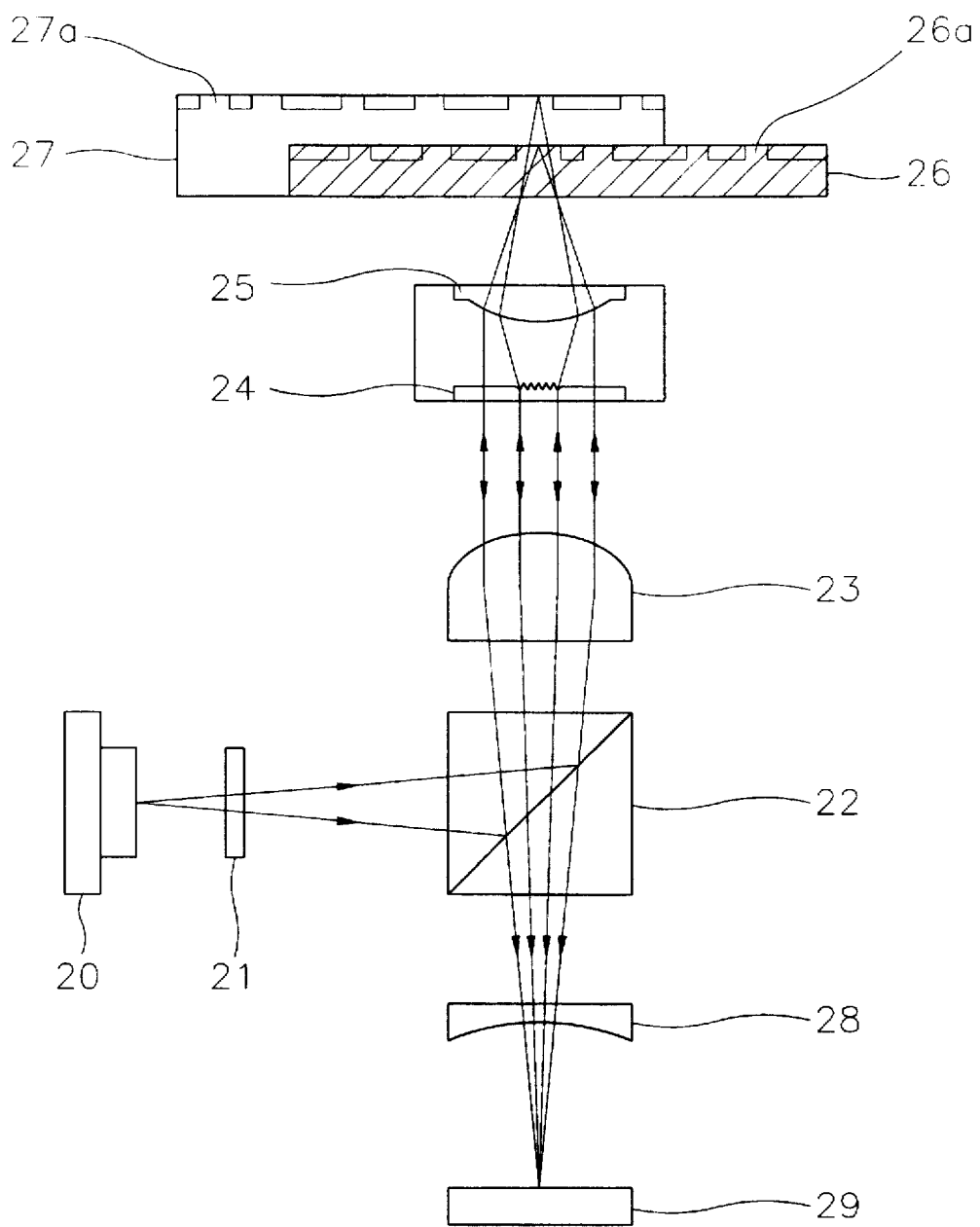
FIG. 2 is a schematic view for illustrating the dual focus optical pickup as another embodiment of the conventional optical pickup.
Figure 3:
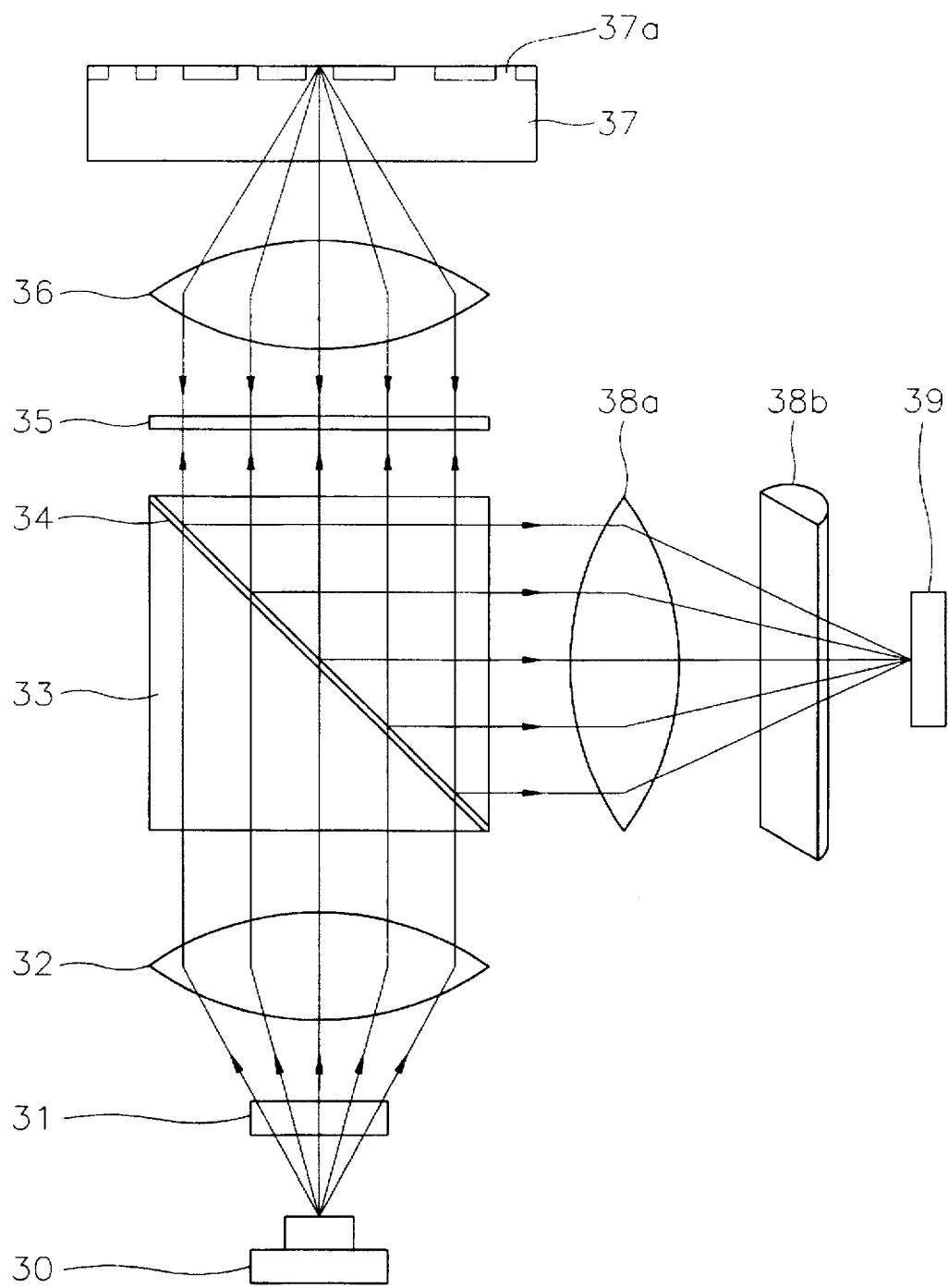
FIG. 3 is a schematic view for illustrating the optical pickup using a polarized beam as a further embodiment of the conventional optical pickup.
Figure 4:
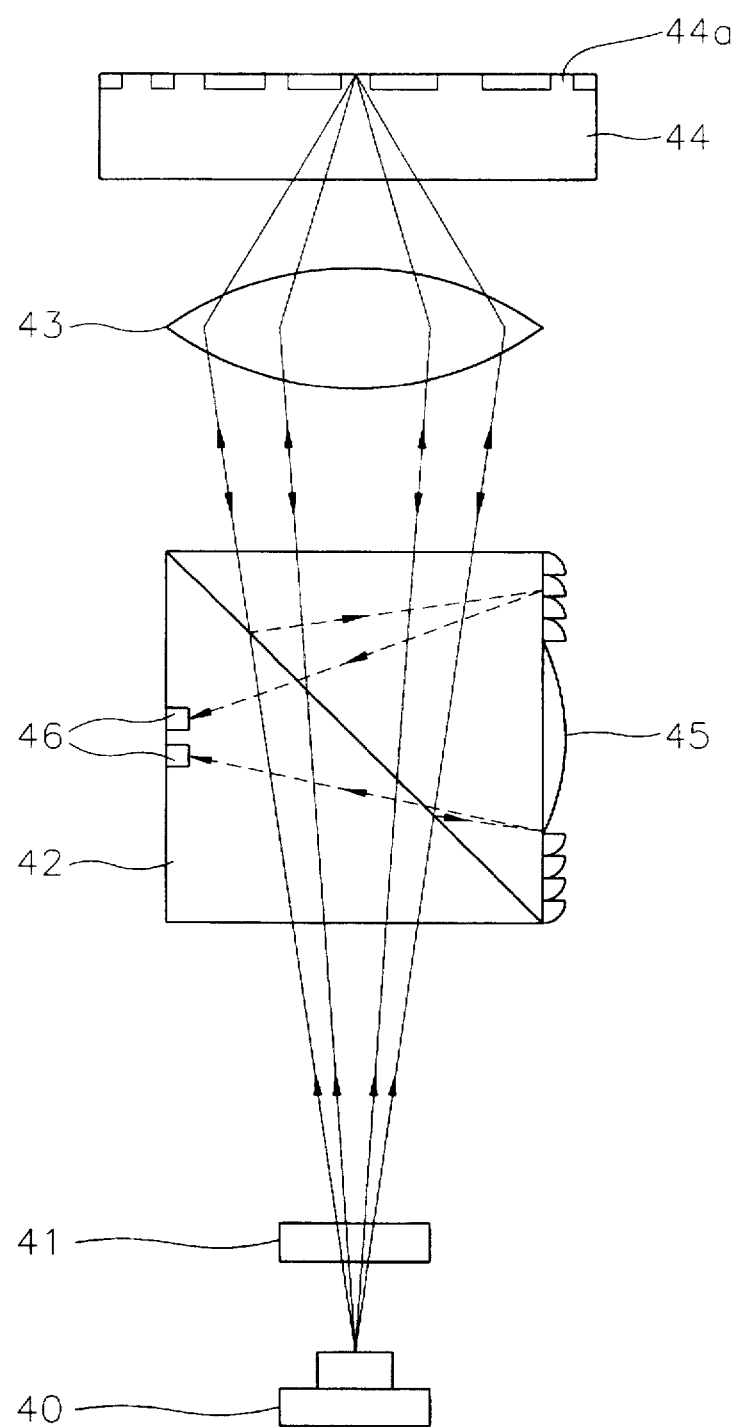
FIG. 4 is a schematic view for illustrating the optical pickup according to a first embodiment of the present invention.

In FIG. 4, an optical pickup according to a first embodiment of the present invention is schematically illustrated.

First, a laser beam radiated from a light source 40 and having about 680 nm wavelength is separated into three beams by a diffraction grating 41. The separated beams are separated again by a beam splitter 42 into reflection light and transmitting light. The reflected light toward an optical disc 44 forms a beam spot having about 1 um on the surface of disc 44 through an objective lens 43 to read the optical information recorded on the disc. At this time, a collimator lens can be provided at an appropriate position to transform an incident light into parallel light to improve light collectivity.

The laser beam radiated on the surface of disc 44 is reflected with different light amount of reflection according to the presence of a pit 44a on which the information is recorded to read the information. The reflected light is incident to beam splitter 42 through objective lens 44. A part of the incident light is reflected to 90°, while the remaining portion of the light is transmitted.

The reflected light from beam splitter 42 is reflected again by a micro fresnel lens 45 formed at one side of beam splitter 42, while generating astigmatism and is forwarded to a 4-separated or 6-separated photodetector 46. The transmittance of the micro fresnel lens is adjusted to nearly zero so that the incident light can be totally reflected. The micro fresnel lens is designed in an ellipsoidal shape to obtain different foci according to the incident light along x-axis and y-axis to generate astigmatism. Accordingly, the photodetector can be attached on the other side of beam splitter 42 where micro fresnel lens 45 is not attached, as shown in FIG. 4.

From the image of the incident light to photodetector 46, the accuracy of the position of the optical pickup, i.e. the focusing error and the tracking error can be detected to generate the focusing and the tracking errors. In response to the signals, a voice coil motor (not shown) which is the actuator of the objective lens is driven to move objective lens 43 to control the focusing and the tracking. The reproduction of the information can be accomplished on the basis of the amount of the reflected light determined by pit 44a on optical disc 44.

According to the above-mentioned embodiment, the beam splitter, the micro fresnel lens for generating the astigmatism and converging the incident light and the photodetector can be manufactured as one element.

Figure 5:
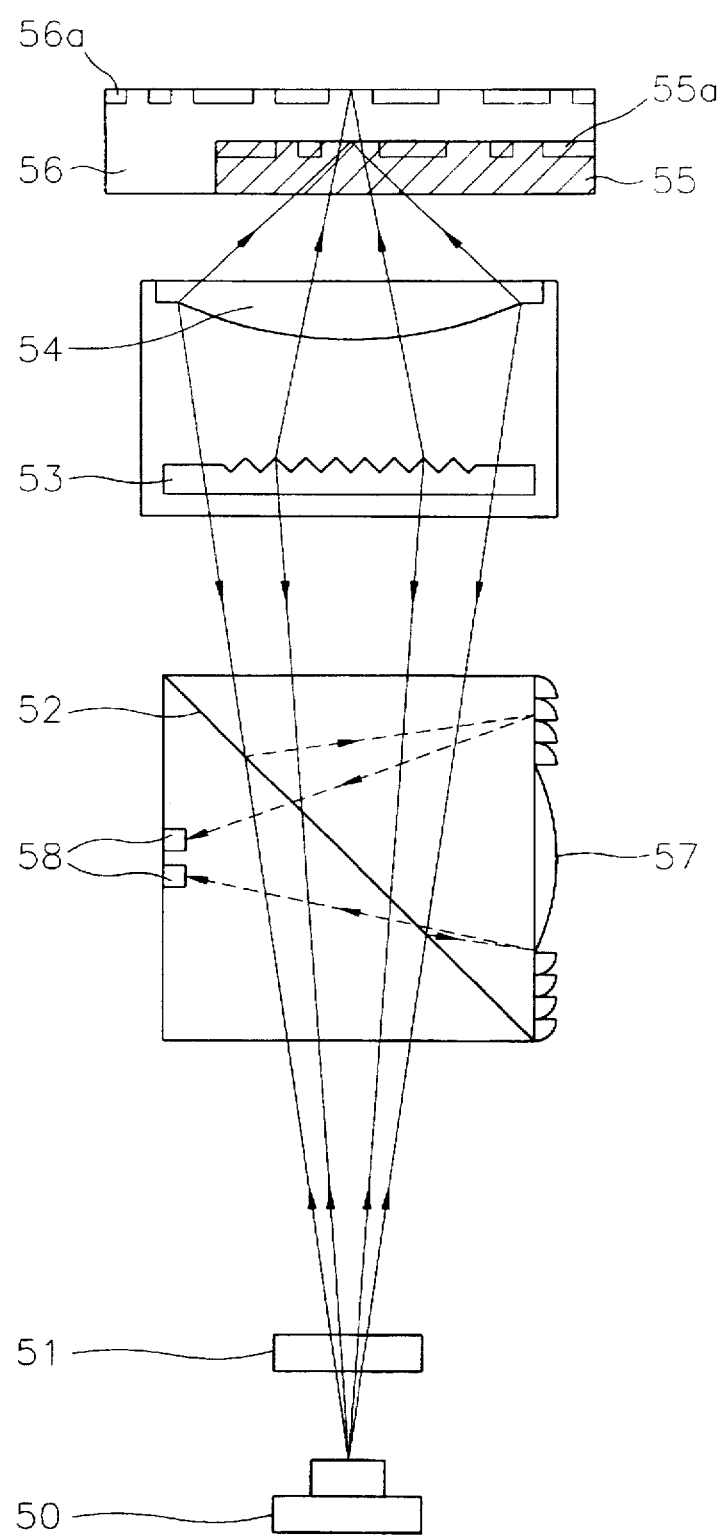
FIG. 5 is a schematic view for illustrating the optical pickup according to a second embodiment of the present invention.

FIG. 5 schematically illustrates a dual focus optical pickup by which two optical discs can be selectively reproduced.

As shown in FIG. 5, laser beam radiated from a light source 50 is separated into three beams by a diffraction grating 51. These beams are separated again into transmitting light and reflection light by a beam splitter 52. The reflected light from beam splitter 52 is incident into a compound lens, which is obtained by aligning a holographic optical lens 53 and an objective lens 54 in parallel. Two focal points are formed at different positions to selectively read the information recorded on a first optical disc 55 having 0.6 mm thickness and a second optical disc 56 having 1.2 mm thickness.

That is, the light is separated by holographic optical lens 53 and then is converged in an airy disc shape having about 1 μm to radiate first optical disc 55 and second optical disc 56 having pits 55a and 56a. The radiated light on the surface of the optical disc where a pit is not formed is totally reflected, while the radiated light on the surface of the optical disc where a pit is formed is diffracted by the pit and deviated from the objective lens. Accordingly, a part of the incident light returns to a photodetector to generate a difference in light amount. The deformed and reflected light information passes through the compound lens and then is reflected by or transmitted through beam splitter 52. The reflected light is reflected again by a micro fresnel lens 57 attached on one side of beam splitter 52, while generating an astigmatism for detecting the focus error. This optical information is incident to a 6-separated photodetector 58 to transform RF signal, focus signal and tracking signal into currents. These currents are reproduced as the original signals by a control circuit.

According to this embodiment, the micro fresnel lens for generating the astigmatism and for converging light is formed on one side of the beam splitter and the photodetector for receiving the reflected light from the micro fresnel lens is formed on the other side of the beam splitter, as shown in FIG. 4.

In the second embodiment, the dual focus optical pickup is illustrated. This can be applied to an optical pickup employing an optical disc having two or more recording layers on one side.

Figure 6:
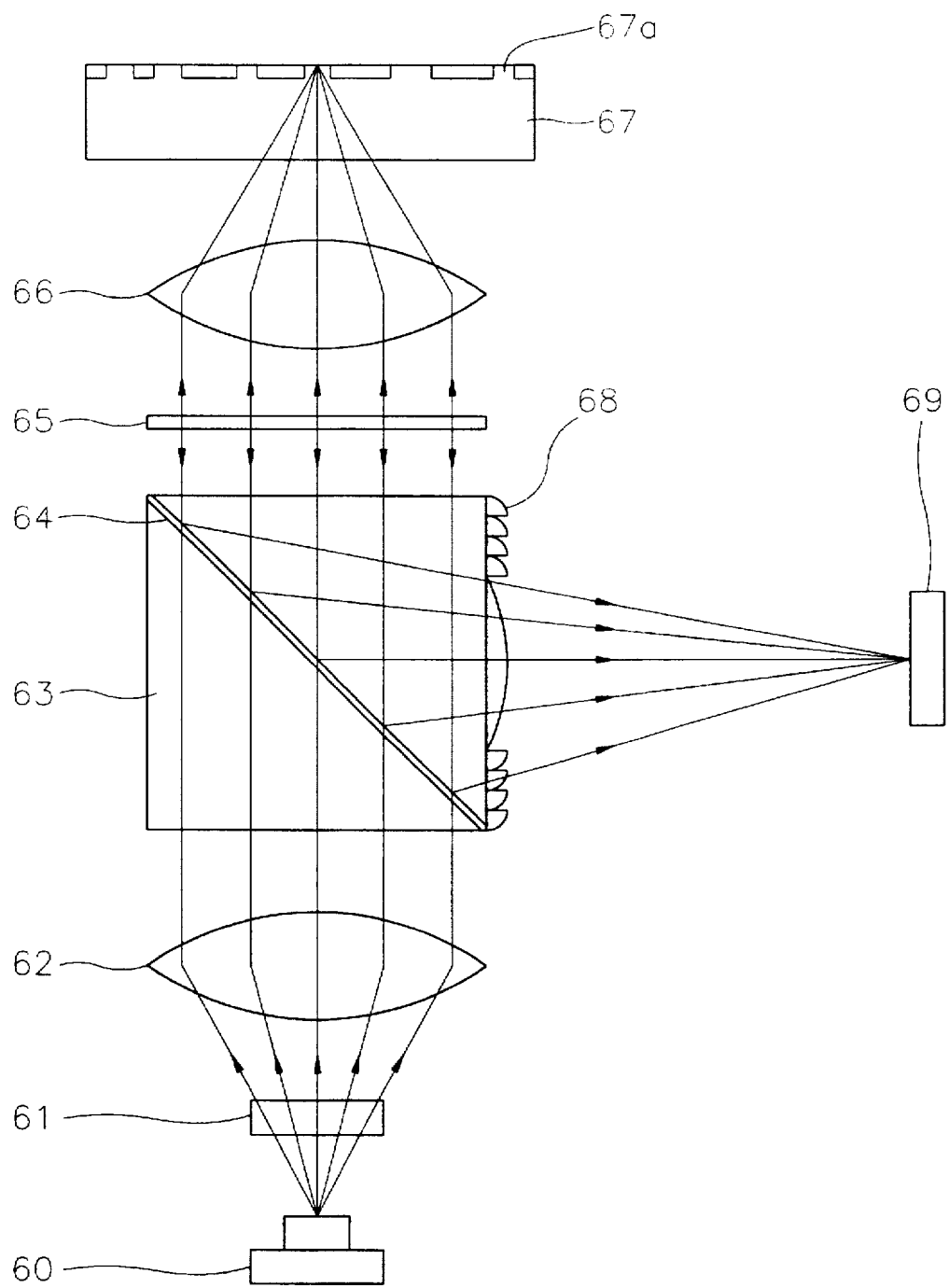
FIG. 6 is a schematic view for illustrating the optical pickup according to a third embodiment of the present invention.

FIG. 6 illustrates an optical pickup having a light source for radiating a polarized beam according to a third embodiment of the present invention.

A light source 60 radiating polarized beam, for example P wave, a diffraction grating 61 for separating the polarized beam into three beams and a collimator lens 62 for transforming the incident light into parallel light are aligned in parallel. The parallel light passes through a polarization layer 64 which transmits the incident P wave, while reflecting S wave. The polarization layer is formed on an inclination of a beam splitter and then through a λ/4 wavelength plate 65 which is a wavelength transforming portion. The λ/4 wavelength plate transforms linear polarization into circular polarization. The transformed light is converged by an objective lens 66, radiated on the surface of an optical disc 67 and reflected with different amount of reflection light according to the presence or absence of a pit 67a where the information is recorded. The reflected light rotates reversely and has opposite direction to the incident light. This reflected light is transformed into parallel light by objective lens 66 and into linear polarization by λ/4 wavelength plate 65. Accordingly, the incident light from λ/4 wavelength plate to the beam splitter is S wave which has 90° different phase from the initially radiated wave from the light source.

The incident S wave to beam splitter 63 is totally reflected by polarization layer 64 by 90° degree. A micro fresnel lens 68 is formed in the passage of this reflected light to converge and generate an astigmatism. A 4-separated or 6-separated photodetector 69 receives this light.

In this embodiment, the micro fresnel lens is installed at the beam splitter and in the passage of the reflected light from the polarization layer coated on the inclination of the beam splitter to simplify the constitution.

From the image of the received light on photodetector 69, the accuracy of the position of the optical pickup, i.e. the focusing error and the tracking error are detected to generate the focusing and the tracking error signals. In response to the signals, the objective lens is moved to control the focusing and the tracking. Further, on the basis of the amount of the reflected light determined by pit 67a of disc 67, the reproduction of the information can be accomplished.

Figure 7:
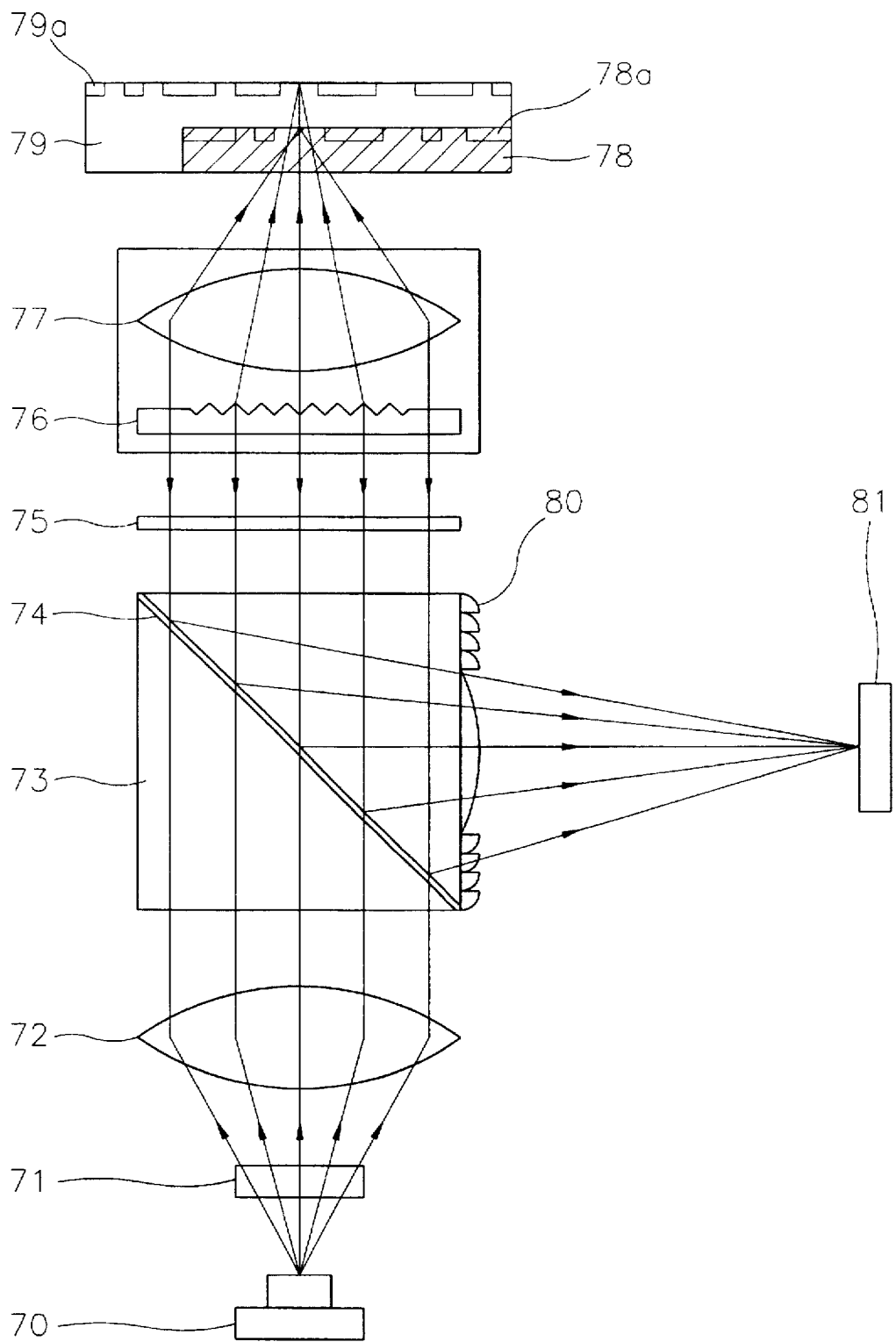
FIG. 7 is a schematic view for illustrating the optical pickup according to a fourth embodiment of the present invention.

FIG. 7 schematically illustrates a dual focus optical pickup employing a light source radiating polarized beam, which can reproduce two optical discs according to a fourth embodiment of the present invention.

The optical pickup includes a light source 70 for radiating polarized light, a diffraction grating 71 for separating the polarized light into three beams, a collimator lens 72 for transforming the separated beams into parallel light, a beam splitter 73, a polarization layer 74 for transmitting the incident light from light source 70 and reflecting the light reflected from an optical disc, a λ/4 wavelength plate 75 for transforming linear polarization into circular polarization, and circular polarization into linear polarization, a micro fresnel lens 80 for generating an astigmatism and converging the incident light to a photodetector and a photodetector, as shown in FIG. 6.

However, a holographic optical lens 76 and an objective lens 77 are aligned in parallel for forming two foci to selectively reproduce the information recorded on a first optical disc 78 having 0.6 mm thickness and a second optical disc 79 having 1.2 mm thickness.

That is, the light is converged in an airy disc shape to about 1 μm by the objective lens, to radiate the surface of first optical disc 78 and second optical disc 79 having pits 55a and 56a. The radiated light on the surface of the optical disc where the pit is not formed is totally reflected, while the radiated light on the surface of the optical disc where the pit is formed is diffracted by the pit and deviated from the objective lens. Accordingly, a part of the incident light returns to a photodetector to generate a difference in light amount.

As described above with various embodiments, the optical pickup according to the present invention can be miniaturized by reducing the number of the optical devices and the manufacturing cost of the optical disc can be reduced. Moreover, the product quality can be improved by preventing the difficulty in aligning so many optical devices accurately.

Although the preferred embodiment of the invention has been described, it is understood that the present invention should not be limited to these preferred embodiments, but various changes and modifications can be made by one skilled in the art within the spirit and scope of the invention as hereinafter claimed.

What is claimed is:

1. An optical pickup comprising:

a light source for radiating a polarized laser beam for reading an optical disc;

a diffraction grating for separating said polarized beam into three beams;

a collimator lens for transforming said separated beams into parallel light;

a beam splitter having a polarization layer at an inclination thereof for transmitting said parallel light and for reflecting a reflected light from said optical disc;

a λ/4 wavelength plate for transforming the transmitted light passed through said beam splitter and incident from said optical disc, from circular polarization into linear polarization, and from linear polarization into circular polarization;

an objective lens for converging light from said λ/4 wavelength plate to form a focus on said optical disc and for forwarding light from said optical disc to said λ/4 wavelength plate;

a micro fresnel lens attached on one side of said beam splitter, said micro fresnel lens generating astigmatism and converging the incident light from said beam splitter; and a photodetector for receiving light from said micro fresnel lens, reproducing an information recorded on said optical disc and detecting a focus error.

2. An optical pickup as claimed in claim 1, further comprising a holographic optical lens between said beam splitter and said objective lens.

3. An optical pickup comprising:

a light source for radiating a laser beam for reading an optical disc;

a beam splitter for separating said laser beam radiated from said light source into transmitting light and reflecting light and for separating light reflected from said optical disc into transmitting light and reflecting light;

an objective lens for converging light from said beam splitter to form a focus on said optical disc and for forwarding light from said optical disc to said beam splitter;

a micro fresnel lens attached on one side of said beam splitter, said micro fresnel lens generating astigmatism and converging the incident light from said beam splitter;

a photodetector for receiving light from said micro fresnel lens, reproducing an information recorded on said optical disc and detecting a focus error, said photodetector being installed on said beam splitter and at an opposing side where said micro fresnel lens is attached; and a holographic optical lens or a micro fresnel lens for the light transmitted through said beam splitter forming two foci at different positions for selectively reading two optical discs each having a different thickness.

4. An optical pickup comprising:

a light source for radiating a laser beam for reading an optical disc;

a beam splitter for separating said laser beam radiated from said light source into transmitting light and reflecting light and for separating light reflected from said optical disc into transmitting light and reflecting light;

an objective lens for converging light from said beam splitter to form a focus on said optical disc and for forwarding light from said optical disc to said beam splitter;

a micro fresnel lens attached on one side of said beam splitter, said micro fresnel lens generating astigmatism and converging the incident light from said beam splitter;

a photodetector for receiving light from said micro fresnel lens, reproducing an information recorded on said optical disc and detecting a focus error, said photodetector being installed on said beam splitter and at an opposing side where said micro fresnel lens is attached; and a diffraction grating for separating said laser beam from said light source into three beams, said diffraction grating being provided between said light source and said beam splitter.

5. An optical pickup as claimed in claim 4, further comprising a collimator lens for transforming said laser beam into parallel light at an appropriate position.

6. An optical pickup as claimed in claim 4, wherein said photodetector is separately installed from said beam splitter and on an extension line from said micro fresnel lens.

7. An optical pickup comprising:

a light source for radiating a laser beam for reading an optical disc;

a beam splitter for separating said laser beam radiated from said light source into transmitting light and reflecting light and for separating light reflected from said optical disc into transmitting light and reflecting light;

an objective lens for converging light from said beam splitter to form a focus on said optical disc and for forwarding light from said optical disc to said beam splitter;

a micro fresnel lens attached on one side of said beam splitter, said micro fresnel lens generating astigmatism and converging the incident light from said beam splitter; and a photodetector for receiving light from said micro fresnel lens, reproducing an information recorded on said optical disc and detecting a focus error, wherein said laser beam is a polarized beam, and a polarization layer at an inclination of said beam splitter for transmitting said polarized beam and reflecting beam having opposite phase to said polarized beam, and a wavelength transforming portion between said beam splitter and said objective lens for transforming light beams of linear polarization into circular polarization and circular polarization into linear polarization are provided, and wherein said micro fresnel lens and said photodetector are installed where said polarization beam is reflected.

8. An optical pickup as claimed in claim 7, wherein a diffraction grating for separating said laser beam into three beams is provided between said light source and said beam splitter.

9. An optical pickup as claimed in claim 7, further comprising a collimator lens for transforming said laser beam into parallel light at an appropriate position.

10. An optical pickup as claimed in claim 7, further comprising a holographic optical lens or a micro fresnel lens for the light transmitted through said beam splitter forming two foci at different positions for selectively reading two optical discs having different thicknesses.

11. An optical pickup as claimed in claim 10, wherein a diffraction grating for separating said laser beam into three beams is provided between said light source and said beam splitter.

12. An optical pickup as claimed in claim 10, further comprising a collimator lens for transforming said laser beam into parallel light at an appropriate position.

13. An optical pickup comprising:

a light source for radiating a laser beam for reading an optical disc;

a diffraction grating for separating said laser beam into three beams;

a beam splitter for separating said laser beam radiated from said light source into transmitting light and reflecting light and for separating light reflected from said optical disc into transmitting light and reflecting light;

an objective lens for converging light from said beam splitter to form a focus on said optical disc and for forwarding light from said optical disc to said beam splitter;

a micro fresnel lens attached on one side of said beam splitter, said micro fresnel lens generating astigmatism and converging the incident light from said beam splitter; and a photodetector formed on an other side of said beam splitter for receiving light from said micro fresnel lens, reproducing an information recorded on said optical disc and detecting a focus error.

14. An optical pickup as claimed in claim 13, further comprising a holographic optical lens between said beam splitter and said objective lens.

15. An optical pickup as claimed in claim 13, further comprising a collimator lens for transforming an incident light into parallel light at an appropriate position.

\* \* \* \* \*